US009276749B2

(12) United States Patent
Tenenboym et al.

(10) Patent No.: US 9,276,749 B2
(45) Date of Patent: Mar. 1, 2016

(54) DISTRIBUTED VALIDATION OF DIGITALLY SIGNED ELECTRONIC DOCUMENTS

(75) Inventors: Isak Tenenboym, San Jose, CA (US); Philip G. Levy, Los Altos, CA (US); Marc T. Kaufman, Woodside, CA (US); John T. Landwehr, Vienna, VA (US)

(73) Assignee: Adobe Systems Incorporated, San Jose, CA (US)

( * ) Notice: Subject to any disclaimer, the term of this patent is extended or adjusted under 35 U.S.C. 154(b) by 96 days.

(21) Appl. No.: 13/562,532

(22) Filed: Jul. 31, 2012

(65) Prior Publication Data

US 2014/0040611 A1 Feb. 6, 2014

(51) Int. Cl.
*H04L 29/06* (2006.01)
*H04L 9/32* (2006.01)
*G06F 21/64* (2013.01)

(52) U.S. Cl.
CPC ............. *H04L 9/3236* (2013.01); *G06F 21/64* (2013.01); *H04L 9/3247* (2013.01); *H04L 9/3268* (2013.01); *H04L 9/3297* (2013.01); *H04L 63/12* (2013.01)

(58) Field of Classification Search
USPC .......................................... 713/155–158, 181
See application file for complete search history.

(56) References Cited

U.S. PATENT DOCUMENTS

| | | | |
|---|---|---|---|
| 6,510,513 B1* | 1/2003 | Danieli ......................... | 713/156 |
| 8,266,676 B2* | 9/2012 | Hardjono et al. ............. | 713/155 |
| 2002/0112164 A1* | 8/2002 | Schmeling et al. ........... | 713/176 |
| 2003/0037234 A1* | 2/2003 | Fu et al. ........................ | 713/158 |
| 2004/0025020 A1* | 2/2004 | Yoshimura et al. ........... | 713/169 |
| 2005/0021969 A1* | 1/2005 | Williams et al. .............. | 713/176 |
| 2006/0129847 A1* | 6/2006 | Pitsos .................... | H04L 9/3263 713/193 |
| 2008/0250247 A1* | 10/2008 | Touzeau et al. ............... | 713/178 |
| 2009/0228701 A1* | 9/2009 | Lin ................................ | 713/155 |
| 2012/0166248 A1* | 6/2012 | Silberstein .................... | 705/7.28 |
| 2013/0173794 A1* | 7/2013 | Agerbak et al. .............. | 709/225 |

* cited by examiner

*Primary Examiner* — Dede Zecher
*Assistant Examiner* — Vadim Savenkov
(74) *Attorney, Agent, or Firm* — Wolfe-SBMC

(57) ABSTRACT

Systems and methods are presented for distributed validation of a digitally signed electronic document. A computing device accesses both a representation of the electronic document and a digital signature for the electronic document that includes a digest generated by the digital signature's creator by applying a one-way function to the electronic document. The computing device applies the same one-way function to the accessed representation of the electronic document to generate a new digest, and includes both the digital signature and the new digest in a request sent to a separate validation server. The request does not include the electronic document. The validation server generates validation results that depend on comparing the digest from the digital signature with the new digest, and that do not depend on having the electronic document available to the validation server. The computing device receives the validation results from the separate validation server.

20 Claims, 5 Drawing Sheets

DISTRIBUTED VALIDATION OF DIGITALLY SIGNED ELECTRONIC DOCUMENTS

BACKGROUND

Distribution of digitally signed electronic documents is expanding into channels connecting an ever-evolving array of electronic devices that receive, send, generate and validate electronic documents. When a signed electronic document is received by an electronic device, the electronic signature on the received document may require validation, and the document may be checked for authenticity. An electronic signature may include a digest or hash of the signed document. The electronic signature itself may be encrypted (e.g., a public-key infrastructure (PKI)—based electronic signature). The electronic signature can be examined to make sure that it is cryptographically valid, and that every component forming the signature is genuine. The document can be tested to determine whether or not its integrity has been compromised.

A software application running on a desktop computer may be configured to manage digital signature verification for documents managed by that application. For example, a copy of Adobe® Acrobat® installed on a desktop computer may be capable of managing signature validation, digital signing, and encryption and decryption of PDF documents. Public-key encryption, digital signing, decryption and signature verification all involve CPU-intensive processes, such as executing asymmetric cryptographic functions used in public-key encryption. Since digital signature validation must be performed frequently, the efficiency of the process is important.

Validating digitally signed electronic documents can require transmission of an extensive file, like an encrypted copy of a large signed electronic document, across a network to a server, or to another device participating in the signature validation. The efficient exchange of such large files may demand substantial bandwidth.

Adequate throughput of signature validation can thus necessitate both substantial processing power and significant bandwidth capacity, as well as the presence of elaborate software applications such as Adobe® Acrobat® and Microsoft® Word® to manage the signature validation process.

A desktop computer or other device may be relieved of some of the burden of validating a digitally signed electronic document by communicating with a central validation or verification server equipped for high-speed validation processing, where the validation server performs the validation and notifies the desktop computer or other device of the results.

New classes of devices are now receiving, sending, generating and validating digitally signed electronic documents, including mobile phones, tablet computers, light-capacity laptops, and other machines whose processing power, storage capacity, software potential, and transmission bandwidth may be significantly less than what is found on traditional equipment such as desktop computers. Even with the aid of a high-powered signature validation server, such lightweight devices may not be capable of validating digitally signed electronic documents with adequate speed. In particular, they may not be able to speedily transmit large files, including encryptions of signed electronic documents, across a network.

SUMMARY

The description herein discloses various embodiments of systems and methods for a computing device accessing an electronic document and a digital signature for the electronic document, where the digital signature comprises a digest of the electronic document generated from applying a one-way function to the electronic document; generating a new digest of the electronic document, where said generating the new digest comprises applying the same one-way function to the accessed electronic document; sending, to a separate validation server, a request to validate the digital signature, where the request includes the digital signature and the new digest, but does not include the electronic document; and receiving, from the separate validation server, validation results for the digital signature, where the validation results: depend on a comparison, performed on the separate validation server, of the digest from the digital signature with the new digest, and do not depend on having the electronic document available to the validation server.

The description herein discloses various embodiments of systems and methods for a validation server receiving, from a separate computing device, a request to validate a digital signature for an electronic document, where the digital signature comprises a digest of the electronic document generated from applying a one-way function to the electronic document, and where the request includes the digital signature and a new digest of the electronic document generated on the separate computing device from applying the one-way function to the electronic document, but the request does not include the electronic document; generating validation results for the digital signature, where said generating the validation results depends on comparing the digest from the digital signature with the new digest, and does not depend on having the electronic document available to the validation server for said generating the validation results; and sending the validation results to the separate computing device.

In various embodiments, a memory is coupled to one or more processors, and the memory stores program instructions executable by the one or more processors to implement a system of distributed validation of digitally signed electronic documents as described herein. In these embodiments, the functions described above may be performed via the system of distributed validation of digitally signed electronic documents. In some embodiments, the system may include a non-transitory computer-readable storage medium storing program instructions that are computer-executable to perform these functions.

Figure 1:
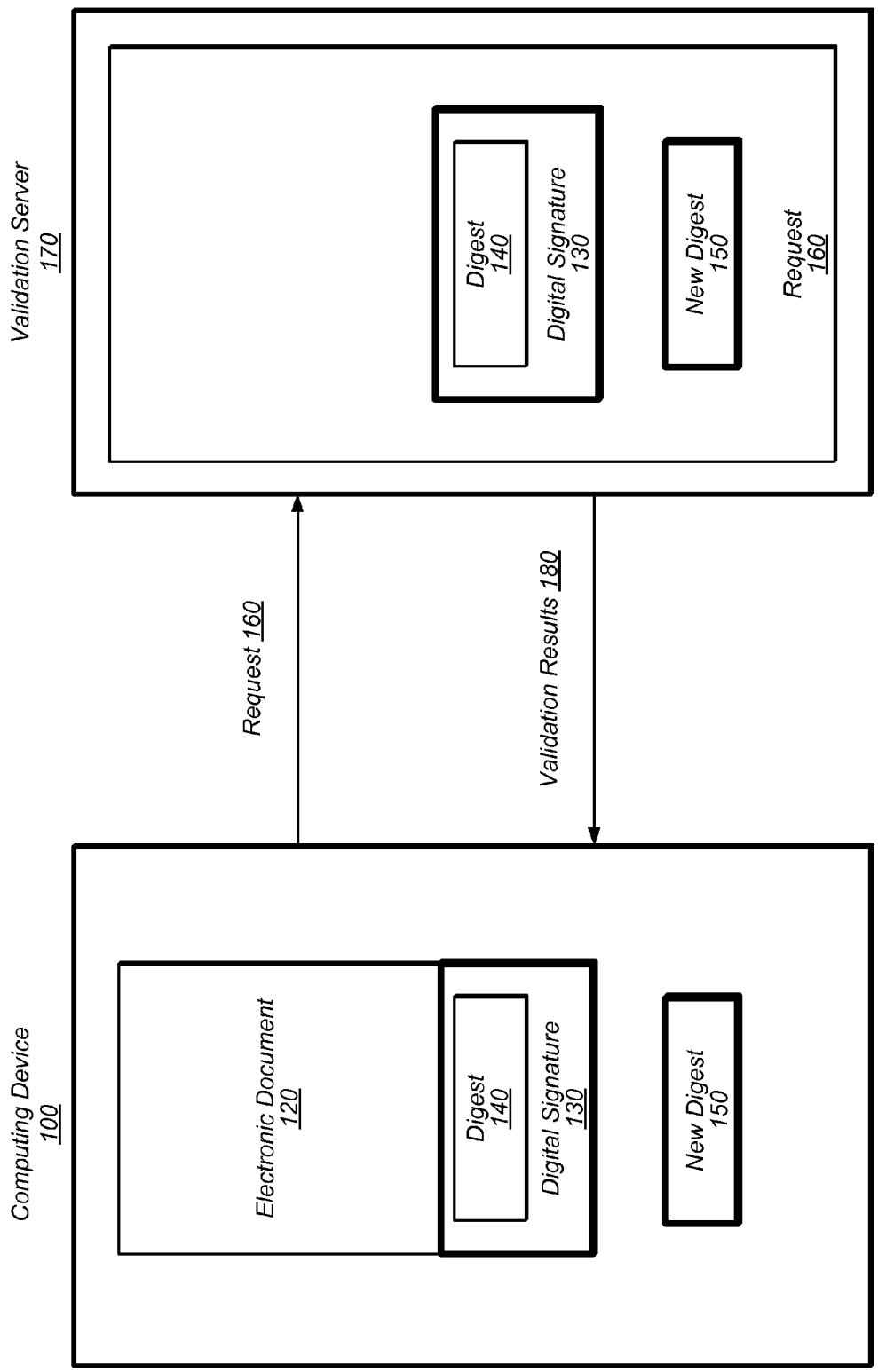
FIG. 1 illustrates one embodiment of components in a system for distributed validation of digitally signed electronic documents.

While the present disclosure is described herein by way of example for several embodiments and illustrative drawings, those skilled in the art will recognize that the disclosure is not limited to the embodiments or drawings described. It should be understood that the drawings and detailed description thereto are not intended to limit the claims to the particular form disclosed, but that on the contrary, the intention is to cover modifications, equivalents and alternatives falling within the spirit and scope of the present disclosure as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the following detailed description are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is understood that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Introduction

The following discussion explores various embodiments of systems and methods for distributed validation of digitally signed electronic documents. FIG. 1 illustrates essential components in one embodiment of these systems and methods in which the validation of digital signature 130 of digitally signed electronic document 120 is distributed across two separate devices, computing device 100 and validation server 170. Computing device 100 depends on validation server 170 to perform at least some of the work required in validating digital signature 130. The system and methods for distributed validation of digitally signed electronic documents may include other participants such as signed document source 200 and PKI Entities 210 illustrated in FIG. 2.

Distributed Validation of Digitally Signed Electronic Documents

Computing device 100 may be embodied in a variety of forms which may include laptop computers, desktop computers, workstations, mainframe computers, servers, and other powerful computing equipment that accesses, receives or stores, and needs to validate, digitally signed electronic documents 120. Computing device 100 may also be implemented as a lightweight or portable or mobile computing device such as a mobile phone, a portable media player, a tablet computer, a netbook computer, a web camera, a video camera, a walkie-talkie, a handheld transceiver, a personal digital assistant, a handheld game device, a portable television, or any other such lightweight or portable or mobile computing device capable of accessing, receiving or storing, and requiring validation of, digitally signed electronic documents 120, but typically having less processing power, storage capacity, software potential, or transmission bandwidth than is normally encountered on more powerful equipment such as desktop computers.

Electronic document 120 itself comprises digital content or digital data which may be embodied in a wide variety of forms. For example, electronic document 120 may, according to various embodiments, comprise any sort of electronic content or data storable in any of numerous file formats. These file formats may include, but are not limited to: archive and compression formats, such as .iso, .tar, .gz, .z, .dmg, .7z, .rar, .zip, and others; computer-aided design formats, such as .dwg, .stl, and others; database formats, such as SQL and others; document formats, such ASCII text (.txt), Microsoft Word's .doc, Office Open XML (.docx), HyperText Markup Language (.html), Portable Document Format (.pdf), TEX (.tex), eXtensible Markup Language (.xml), and others; font file formats, such as Bitmap Distribution Format (.bdf), PostScript (.ps), and others; geographic information system formats such as GeoTIFF, Keyhole Markup Language, and others; image file formats, such as JPEG, TIFF, PNG, and others; vector graphics formats, such as Adobe Illustrator, Scalable Vector Graphics (.svg), and others; 3D graphics formats, such as MD2, and others; sound and music formats such as Audio Interchange File Format (.aiff), Microsoft Wave (.wav), MPEG Layer 3 (.mp3), and others; spreadsheet formats; video formats, such as 3GP (.3gp), Flash Video (.flv), QuickTime, MPEG, Windows Media Video (.wmv), and others; video editing formats; video game data formats; and webpage formats, such as eXtensible Markup Language, CGI (.cgi), and others.

Figure 2:
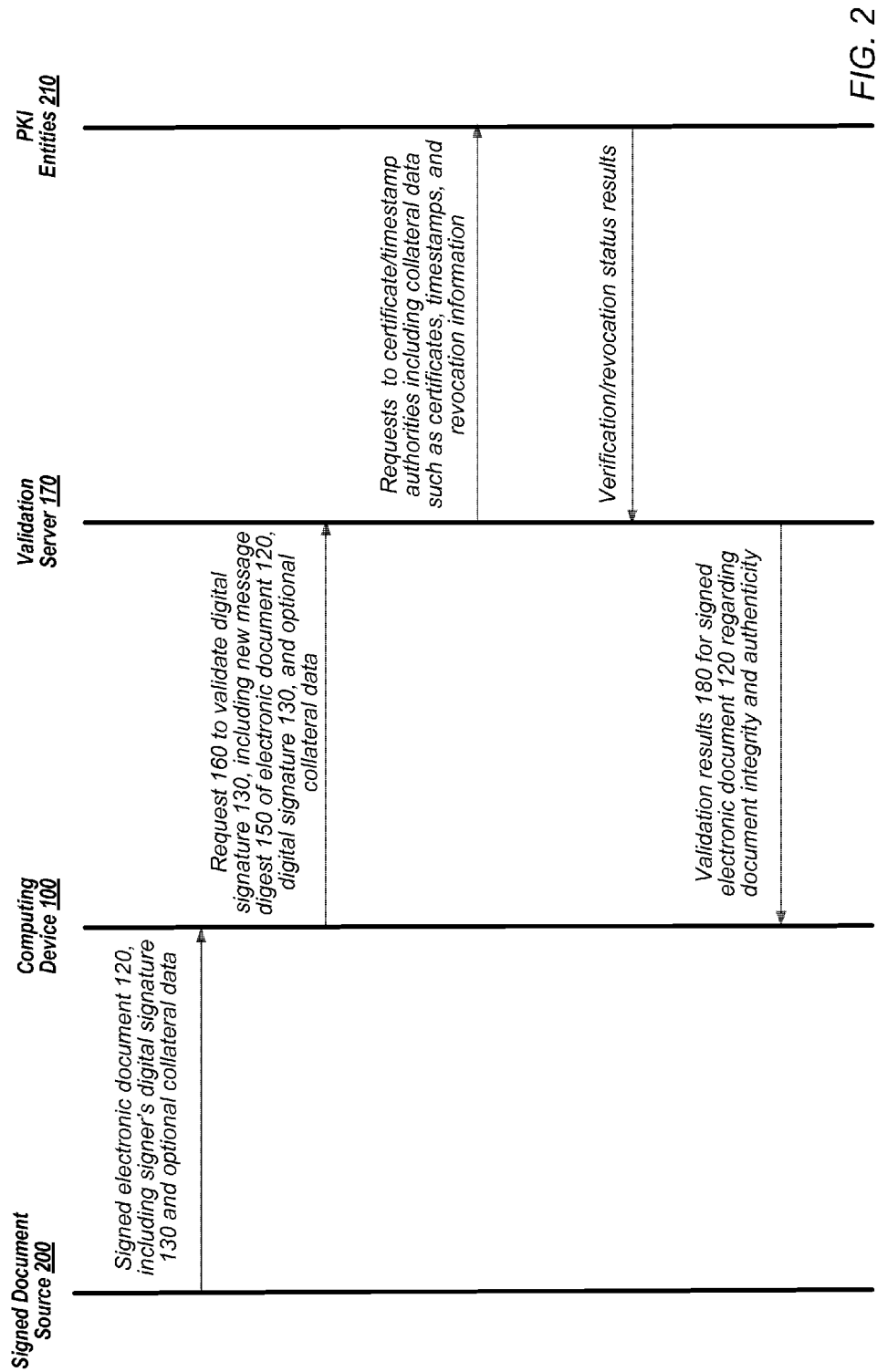
FIG. 2 illustrates one embodiment of a series of exchanges among various components in a system for distributed validation of digitally signed electronic documents.

Electronic document 120 may, according to some embodiments, be received on computing device 100 from some other computing device not illustrated in FIG. 1. As shown in FIG. 2, computing device 100 may obtain electronic document 120, along with a signer's digital signature 130 of electronic document 120, from a separate signed document source 200.

Signed document source 200 may be embodied in numerous ways. For example, signed document source 200 may be a computing device directly under the control of the signer whose digital signature 130 accompanies electronic document 120 being transmitted to computing device 100. Signed document source 200 may also be a computing device intermediating between the signer whose digital signature 130 accompanies electronic document 120 and computing device 100, which receives signed electronic document 120. In other instances signed document source 200 may be embodied as device configured to deliver to computing device 100 new data that may include signed electronic document 120, or configured to provide computing device 100 with a data update that includes at least signed electronic document 120. Such delivery of new data or updated data may be triggered by a request signal received from computing device 100, where the request signal is generated on computing device 100 by an application running on computing device 100. Alternatively, such provision of new data or a data update from signed document source 200 to computing device 100 may occur without any request from computing device 100. For example, agents separate from computing device 100 that are operating programmatically, or responding to specific individual requests, may trigger the sending of new data or a data update from signed document source 200 to computing device 100, where the new data or data update includes at least signed electronic document 120.

In other instances, computing device 100 may initiate the distributed validation methods described herein on a stored copy of signed electronic document 120 that already exists on computing device 100, and therefore, in some instances, the distributed validation methods described herein may not include the importation of signed electronic document 120 from an external signed document source 200. According to certain embodiments, signed electronic document 120 may have been installed on or written onto computing device 100 at the time of device 100's manufacture, or as part of a hardware, firmware, or software update of computing device 100. In certain instances, signed electronic document 120 may be generated or created on computing device 100 itself.

According to still other embodiments, computing device 100 may initiate the distributed validation methods described herein on a copy of signed electronic document 120 that exists external to computing device 100 without importing signed electronic document 120 from an external signed document source 200.

Electronic document 120 itself may, according to some embodiments, have originated or been created on a device separate from computing device 100 at any time during the period preceding the invocation of the distributed validation methods described herein. Electronic document 120 may have been signed with digital signature 130 either at the time of creation of electronic document 120 or at any time after the creation of electronic document 120.

Electronic document 120 may have one or more representations of a digital signature. Each digital signature representation includes a signature block which may include cryptographic representations for authenticity, integrity, and/or non-repudiation. Since the CPU power and network connectivity required to fully process each signature block is significant, many computing devices do not have the capability to fully process this information. To address such issues, at least part of the validation process of digital signature blocks may be offloaded from computing device 100 to validation server 170. Computing device 100 may calculate a new digest 150 of electronic document 120. Computing device 100 extracts digital signature block 130 from signed electronic document 120 and sends a request 160 to validation server 170 to validate the digital signature for the signed document 120. The request 160 includes digital signature block 130, new digest 150, and possibly additional collateral information (as discussed below), but does not include electronic document 120. The validation server 170 validate the digital signature block and provides validation results 180 to computing device 100. Since validation server 170 was supplied the new digest 150 with request 160, computing device 100 dos not need to transfer the entire electronic document 120 to validation server 170 to have the digital signature for document 120 validated, saving considerable data transmission bandwidth. Also, the cryptographic functionality to extract the digest 140 from digital signature 130 to compare to new digest 150 as part of the digital signature validation process has been offloaded to validation server 170. Other aspects of the digital signature validation process may also be offloaded to validation server 170, such as validation of certificate chains that may be included with digital signature 130.

The validation server 170 is able to fully examine the signature blocks by extracting the needed information, such as certificate chains, timestamps, embedded revocation responses, etc. For each signature block, the validation server 170 may check to see if there is a proper certificate chain built, with all the right policies and constraints, to a trusted anchor root certificate authority stored on the server, and all of the certificates are valid (not revoked)—through a combination of either checking the embedded revocation responses in the signature block and/or checking online certificate status protocol (OCSP) responses and/or certificate revocation list (CRL) response for each certificate. This also applies to any of the timestamp information provided in each signature block, which can have its own cryptographic certificate chains and related revocation information. All such aspects of the validation process may be offloaded from device 100 to validation server 170. The validation results response 180 from server 170 to device 100 may indicate that all signatures for a document are good if all validations passed, or may indicate which signatures are bad (e.g., with error codes).

Thus, the signature for a signed electronic document 120 on device 100 may be validated with as few as one network transmission of all signature blocks from the device 100 to the validation server 170, and the validation server provides one network transmission back summarizing the responses and issues, in some embodiments. For example, asymmetric cryptography calculations for the validation process may happen on the server 170 instead of device 100, and any further network requests required to validate each signature block may happen from the server 170, instead of happening from the device 100. Other optimizations may be performed on server 170, such as in the case where multiple signature blocks share similar information that can be analyzed once. For example, the same intermediate certificate is in multiple signatures, and therefore only needs a revocation check once for all signature blocks, not uniquely in each signature block. Communication between device 100 and validation server 170 may be protected on the network using, for example, transport layer security (TLS) or secure sockets layer (SSL) protocols so that device 100 knows it is communicating with an authoritative validation server and the transmissions are secure.

FIG. 2 illustrates the transfer, from signed document source 200 to computing device 100, of signed electronic document 120, including signer's digital signature 130, and possibly further including auxiliary information such as a digital certificate or timestamp and other collateral data. This transfer may be made according to any of numerous cryptographic protocols for secure communication over the Internet or over some other network. For example, the transfer may be made under Transport Layer Security (TLS) or Secure Sockets Layer (SSL), or under Hypertext Transfer Protocol Secure (HTTPS). Alternatively, the transfer may also be made over an insecure connection between signed document source 200 and computing device 100.

As with traditional paper documents, electronic document 120 may, according to various embodiments, have been signed by only one digital signer, or it may have been signed by multiple digital signers. Electronic document 120 may, therefore, have just one digital signature 130, or may have more than one digital signature 130. If there are multiple digital signatures 130, then they may have been generated together, or they may each have been added to electronic document 120 at a different time, that is, applied serially to electronic document 120.

The entity signing electronic document 120 with digital signature 130 may be a person who signs electronic document 120 by generating digital signature 130 for electronic document 120 via a computing device. Alternatively, the agent signing electronic document 120 with digital signature 130 may be only a machine. According to various embodiments in which there are multiple signatures 130, the signers may all be people, all be machines, or be a mixture of both people and machines. In each case, digital signature 130 itself is generated using a machine.

Digital signature 130 itself may be generated by the signer, whether the signer is a human or a machine, according to numerous schemes. The actual generation of digital signature 130 is typically performed by a computing device acting under the direction of or on behalf of the signer, whether the signer is human or machine.

According to some embodiments, creation of digital signature 130 may depend on applying a one-way function to electronic document 120. In general, a one-way function is much easier to compute than to invert. That is, if x belongs to the domain of a one-way function f, then f(x) can be easily computed, but if one has only a value y in the range of f, then it is difficult to reverse f to find a member x of the domain of f which f maps to y, that is, such that f(x)=y. The one-way function applied to electronic document 120 may be embodied in many ways. In particular, the one-way function applied to electronic document 120 to generate a digest of electronic document 120 may be embodied as a cryptographic hash function implemented according to any of numerous recipes, including, for example, MD4, MD5, HMAC MD5, SHA-1, HMAC SHA-1, SHA-2, HMAC SHA-2, and the upcoming SHA-3 formula to be announced in 2012 by the United States National Institute of Standards and Technology.

Data input to the cryptographic hash function for encoding may be referred to as a "message," and data output by the cryptographic hash function may be referred to as the "message digest," or simply "digest." When a cryptographic hash function is applied to an input message of arbitrary length, it returns a message digest having a fixed, predetermined size, or length, that depends on the implementation of the cryptographic hash function, but not on the length of the input message. In some instances, the input to the cryptographic hash function, or input message, may be partitioned or broken up into a series of blocks all the same size, with the final block, or several terminating blocks, padded to the same size as the preceding blocks. Depending upon the embodiments, various padding schemes may be applied to embed extra bits in the final block or blocks to increase collision resistance and to assure termination such that the hashing process cannot be extended to perform a length-extension attack. The embedded bits of the terminal block or blocks may, in some embodiments, encode the exact length of the message itself.

The cryptographic hash function may be applied iteratively to the sequence of blocks in order to produce a message digest having the predetermined length that is determined by the implementation of the cryptographic hash function. Iterative application of the cryptographic hash function to the input blocks may include a feedback mechanism, or chaining mode, for the sequence of blocks in which the result of operations on a previous block are fed back into the operations for the current block. The result of applying the cryptographic hash function to a given block may thus depend both on the given block and on previous blocks.

No matter the size or length of the message, the message digest will have the same fixed length as other digests generated by the cryptographic hash function for other messages. The output, or message digest, produced by applying a cryptographic hash function to a message may therefore be far smaller than the message itself, since the message can be of any arbitrary size. The one-way cryptographic hash function may thus "compress" the message such that the size of the message digest that results from applying the cryptographic hash function to the input message may be much smaller than the input message itself.

Aside from being a one-way function, such a cryptographic hash function may typically have the property that even a slight change to its input will, with high probability, completely change the resulting output. In addition, such cryptographic hash functions are typically collision resistant, such that it is very difficult or impossible to find two inputs which have the same output under the cryptographic hash function.

The cryptographic hash function may be used for various purposes, including the purpose of verifying the message integrity of a message such as electronic document 120, that is, ensuring that the content of a message such as electronic document 120 has not been altered. By the nature of the cryptographic hash function, determining whether a message such as electronic document 120 has been altered, either during transmission or in some other way, may be essentially equivalent to determining whether two separate applications of the same cryptographic hash function to two presumed copies of, or two presumed representations of, the message yield the same result, that is, the same message digest.

For example, if a signer's digital signature 130 of a presumably authentic, uncorrupted instance of electronic document 120 contains the signer's digest 140 of electronic document 120 that the signer generated by applying a cryptographic hash function to electronic document 120, then an agent accessing another presumably authentic, uncorrupted instance of electronic document 120 can generate a new digest 150 of electronic document 120 by applying the same cryptographic hash function to electronic document 120, and then compare signer's digest 140 with accessor's new digest 150. If signer's digest 140 and accessor's new digest 150 are the same, the accessing agent is assured to high degree of certainty that the signer's presumably authentic, uncorrupted instance of electronic document 120 and the accessing agent's other presumably authentic, uncorrupted instance of electronic document 120 are identical. Owing to the collision resistance of the cryptographic hash function, the probability that the two instances of electronic document 120 might be different is very small.

On this basis, when a signer of electronic document 120 generates digital signature 130 of electronic document 120, the signer may create the signer's digital signature 130 by first applying a cryptographic hash function to electronic document 120 to create a corresponding message digest 140 of electronic document 120, and then encrypting message digest 140 itself to form digital signature 130. Digital signature 130 may not include an encryption of the entirety of electronic document 120, but rather include an encryption of the message digest 140 that is generated from electronic document 120. Since applying the cryptographic hash function to an input message yields a message digest whose size or length is invariant with respect to the input data, it follows that in many cases, message digest 140 will be much smaller than the electronic document 120 whose image, under the cryptographic hash function, is message digest 140.

Encrypting message digest 140 may be accomplished by means of various encryption schemes. For example, any of numerous public-key encryption algorithms of the public-key infrastructure (PKI) may be applied to message digest 140 to generate digital signature 130. Two mathematically paired keys, a private key and a public key, may be used in conjunction with any of numerous known public-key algorithms in generating the digital signature and in decrypting the digital signature thus generated. As non-limiting examples, asymmetric-key algorithms used to generate digital signature 130 may include RSA (Rivest, Shamir, and Adelman's algorithm), DSA (Digital Signature Algorithm), ECDSA (Elliptic Curve Digital Signature Algorithm), as well as other asymmetric-key algorithms. The public-key infrastructure allows the signer of, or a distributor of, the electronic document 120 signed by the signer to prove that the original electronic document 120, whose representation is currently being accessed via computing device 100, really was signed by the signer, so that signed electronic document 120 may be taken as being authentic. At the same time it also allows the signer, or the signer's representative or distributor, to prove that a representation of electronic document 120 accessed via computing device 100 is not an alteration of the original electronic document 120 that the signer actually signed with digital signature 130. Thus, the integrity of the original electronic document 120 signed with digital signature 130 may be assured in the sense that the representation of electronic document 120 being accessed via computing device 100 may be shown to be equivalent to the original electronic document 120 signed by the signer who generated the digital signature 130 of the original electronic document 120.

Consequently, by using his private key to encrypt digest 140, the signer can assure both the authenticity and the integrity of signed electronic document 120.

Computing device 100 may initiate the distributed validation methods described herein on any of numerous diverse embodiments of digitally signed electronic document 120. For example, signed electronic document 120 may be realized in some embodiments as data that includes only a representation of electronic document 120 itself along with a representation of digital signature 130. For these embodiments, as well as for other embodiments comprising collateral data described below, data comprising signed electronic document 120, including a representation of electronic document 120 itself, together with a representation of digital signature 130, may typically be transferred from signed document source 200 to computing device 100 through a secure connection in order to lessen the chance of data corruption.

To validate digital signature 130, and thus determine both the authenticity and the integrity of the representation of electronic document 120 being accessed via computing device 100, the following may be performed using the distributed technique described herein:

a. generate, at computing device 100, a new digest 150 (compute a hash value) by applying the cryptographic hash function to the representation of electronic document 120 being accessed via computing device 100;

b. decrypt, at validation server 170, the representation of digital signature 130 being accessed by computing device 100 to recover the signer's digest 140 (signer's hash value) of electronic document 120; and c. compare signer's message digest 140 with newly-generated message digest 150.

If signer's message digest 140 and newly-generated message digest 150 are equal, then the accessor, computing device 100, may be reasonably assured of both the authenticity and integrity of the representation of electronic document 120 being accessed via computing device 100.

If the electronic document 120 was signed as a plaintext document and the representation of electronic document 120 being accessed via computing device 100 already exists in an unencrypted state as plaintext, then no decryption is needed before applying the cryptographic hash function to the representation of electronic document 120 being accessed via computing device 100. If the document at client device 120 is encrypted but was signed when unencrypted, then the document may first be decrypted at client device 100 before calculating newly-generated message digest 150. In other embodiments, the signer's message digest may have been calculated based on an encrypted document. In such an embodiment, the newly-generated message digest 150 may be calculated based on the encrypted document at the client device 100.

As explained above, the distributed validation methods of the instant application may be applied when computing device 100 is embodied in a wide variety of forms. In contemplating the functionality of these distributed validation methods, it is helpful to consider restrictions in processing power, storage capacity, software potential, and transmission bandwidth that may limit an embodiment of computing device 100 as a lightweight or portable or mobile computing device, such as a mobile phone or a tablet computer, in comparison to an embodiment of computing device 100 as a laptop computer, desktop computer, workstation, mainframe computer, server, or other powerful computing machinery. Even a state-of-the-art smart phone may lack the processing power, storage capacity, software potential, or transmission bandwidth of a larger computing machine. Larger computers may have an installed software application configured to manage the validation of digital signatures, digital signing of electronic documents, encryption and decryption processes, and other public-key infrastructure (PKI) operations. Installation of such a software application onto a smart phone may not be feasible. Limitations in processing power or storage capabilities may render the running of such an application on a lightweight portable device burdensome to the point of impracticality. Public-key encryption, digital signing, decryption and signature validation all involve CPU-intensive processes which may absorb too many of the resources of a mobile phone or other lightweight device. The distributed validation methods described herein allow the burden of such activities to be shifted away from computing device 100 onto a workhorse validation server 170 so that validation of a signed digital electronic document 120 may be performed quickly and efficiently without bogging down the operation of computing device 100, particularly when it is embodied as a lightweight or portable or mobile computing device like a cell phone. In some embodiments, computing device may not possess the PKI infrastructure or other needed components to fully validate the digital signature itself.

Figure 3:
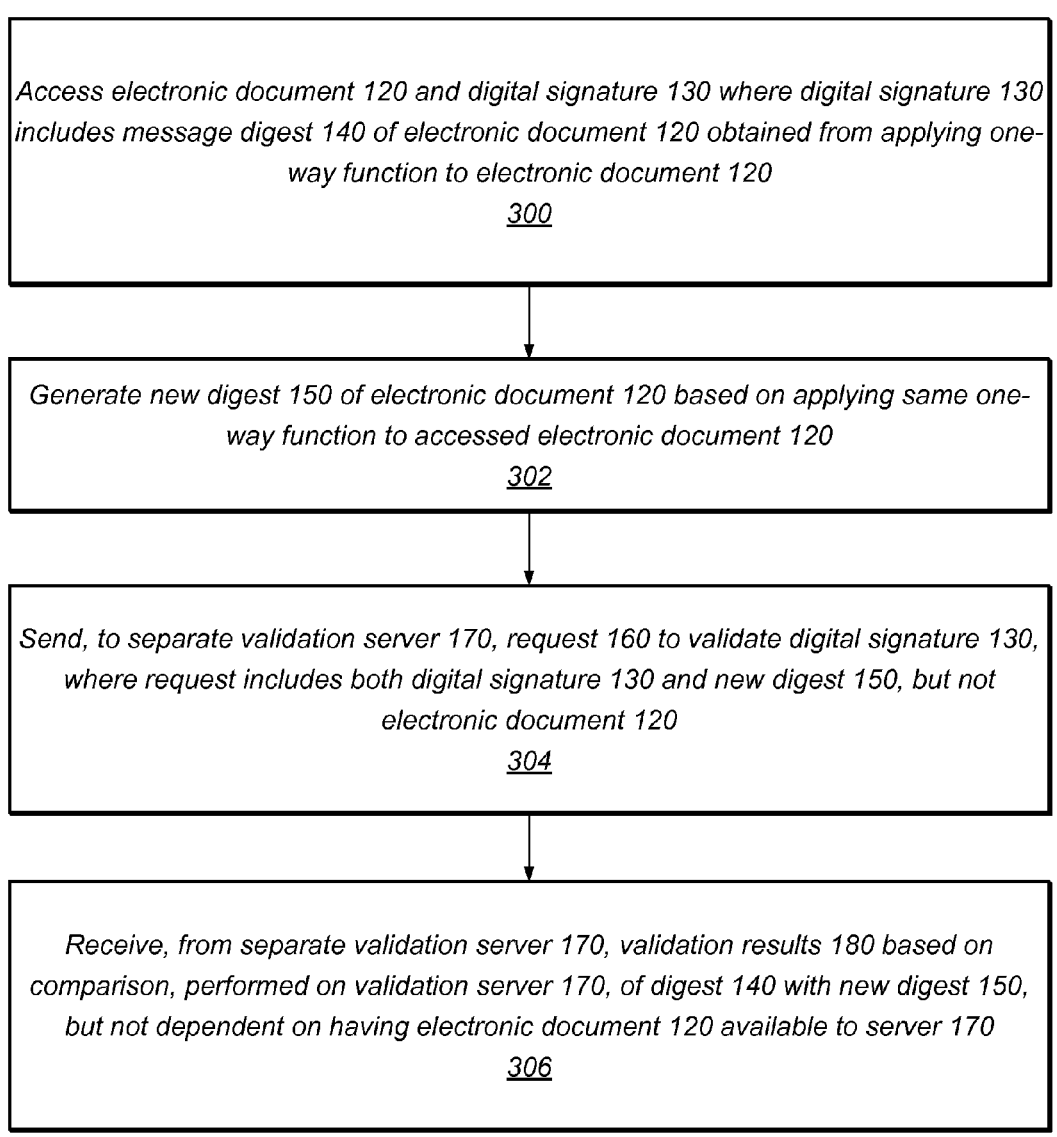
FIG. 3 is a flow diagram illustrating one embodiment of a method in which a computing device accesses a digitally signed electronic document and communicates with a separate validation server to obtain validation results for the digitally signed electronic document.

According to the distributed validation methods described herein, as illustrated at block 300 of FIG. 3, computing device 100 may access electronic document 120 and digital signature 130 from signed document source 200, as shown in FIG. 2. Accessed digital signature 130 includes a message digest 140 of electronic document 120 obtained from the document signer's application of a one-way function to the representation of electronic document 120 that was signed by the document signer. For the embodiment presently under discussion, computing device 100 is able to access a plaintext representation of electronic document 120 without performing a decryption. As indicated at block 302 of FIG. 3, computing device 100 applies the same one-way function, which may be embodied as a cryptographic hash function, to the representation of electronic document 120 being accessed via computing device 100 in order to obtain new message digest 150 of electronic document 120. The one-way function applied at block 302 is the same one-way function applied to the original representation of electronic document 120 on behalf of the signer during the process of generating digital signature 130.

Computing device 100 may ascertain which one-way function was applied to the original electronic document 120 for the signer by any of various means. For example, signed document source 200 may inform computing device 100 which one-way function should be used by stating essential information about the one-way hash function. Such information may be included in digital signature 130, or may accompany digital signature 130. It may also be embodied as an attachment to electronic document 120, or be otherwise included in the data transmitted from signed source 200 to computing device 100. For embodiments that include a digital certificate for the signer's public key, as described later in the instant application, the certificate itself may state which one-way function was used by the signer in creating the signer's hash of the original electronic document 120. In any event, computing device 100 generates its own new message digest 150 of electronic document 120 based on applying to the currently-accessed representation of electronic document 120 exactly the same one-way function that was applied by the signer to the original electronic document 120 to generate the signer's own message digest 140 of electronic document 120. Generating a hash of electronic document 120 is typically relatively fast and easy, especially in comparison to executing the encryption and decryption processes of public-key cryptography. Thus, the creation of the new digest 150 typically does not place extraordinary demands on computing device 100, even when it is embodied as a lightweight or portable or mobile computing device, such as a mobile phone or a tablet computer.

At this point, computing device 100 will have generated new message digest 150, but will not have directly accessed the signer's message digest 140, which is stored in encrypted form within digital signature 130. Under the distributed validation methods described herein, computing device 100 typically does not need to perform a decryption of digital signature 130, or to directly access the signer's message digest 140. Instead, once it has generated new message digest 150, computing device 100 is prepared to turn over the remainder of the validation processing of digital signature 130 to a separate validation server 170. As illustrated at block 304 of FIG. 3, computing device 100 sends a request 160 to separate validation server 170 to validate digital signature 130. Request 160 includes at least digital signature 130 and new message digest 150 of electronic document 150, but does not include electronic document 120. Request 160 may also include optional collateral data, as described below. See also FIGS. 1 and 2.

Computing device 100 explicitly does not send electronic document 120 to validation server 170 in any form, whether encrypted or unencrypted. On the contrary, since validation server 170 now possesses both digital signature 130, which contains an encryption of the signer's digest 140 of the signer's copy of electronic document 120, and also possesses the new digest 150 generated by computing device 100 from its own representation of electronic document 120, validation server can validate both the authenticity of digital signature 130 and the integrity of electronic document 120 without having access to electronic document 120 itself. Validation server checks the integrity of electronic document 120 based on comparing the signer's digest 140, calculated previously by the signer's application of a one-way hash function to the signer's copy of electronic document 120, with the new digest 150, calculated previously by computing device 100 by applying the same one-way function to a representation of electronic document 120 accessed by computing device 100.

Several advantages accrue, in some embodiments, by virtue of computing device 100's not having to transmit electronic document 120 to validation server 170. Firstly, since the bandwidth available to computing device 100 for transmitting data to external destinations may be constrained, particularly when computing device 100 is embodied as a lightweight or portable or mobile computing device like a mobile phone or tablet computer, and since electronic document 120 may itself be large, thus requiring a large number of transmission bits, computer 100 is spared the bandwidth burden of having to transmit any of electronic document 120, whether in part or in full. Secondly, since electronic document 120 is not transmitted to validation server 170, the contents of electronic document 120 may be kept secret from validation server 170, thus enhancing confidentiality. Thirdly, validation server 170 is not encumbered with maintaining storage space for such electronic documents 120, nor with responsibility for the secure maintenance of electronic documents 120.

For the embodiments currently under discussion, in which computing device 100 has access to a plaintext representation of electronic document 120, the distributed validation scheme described herein relieves computing device 100 from performing CPU-intensive public-key encryption or decryption algorithms, or even from hosting a program capable of performing such algorithms. Instead, as indicated at block 306 of FIG. 3, computing device 100 merely receives from validation server 170 validation results 180, which depend on a comparison, performed on separate validation server 170, of message digest 140 with new message digest 150, but which do not depend on having electronic document 120 available to server 170. Validation results 180 inform computing device 100 whether or not digital signature 130 is authentic and whether or not the representation of electronic document 120 accessed by computing device 100 is a legitimate equivalent or facsimile of the representation of electronic document 120 that was originally signed by digital signature 130. With the exception of generating new digest 150 by applying the one-way function to a representation of electronic document 120, computing device 100 does not have to perform any validation operations, nor does computing device 100 have to perform any public-key infrastructure processes. Neither does computing device 100 have to be capable of performing any public-key infrastructure processes.

The bulk of the validation responsibility for validating digitally signed electronic document 120 is shifted away from computing device 100 and onto validation server 170, which may be embodied as one or more powerful computing machines participating in a network such as the Internet and capable of executing standard public-key infrastructure (PKI) functions. FIG. 1 shows validation results 180 being transmitted from validation server 170 to computing device 100.

FIG. 2 shows validation server 170 transmitting validation results 180 for signed electronic document 120, regarding the integrity and authenticity of digitally signed electronic document 120, to computing device 100. Block 404 of FIG. 4 illustrates validation server 170 sending validation results 180 to separate computing device 100.

Figure 4:
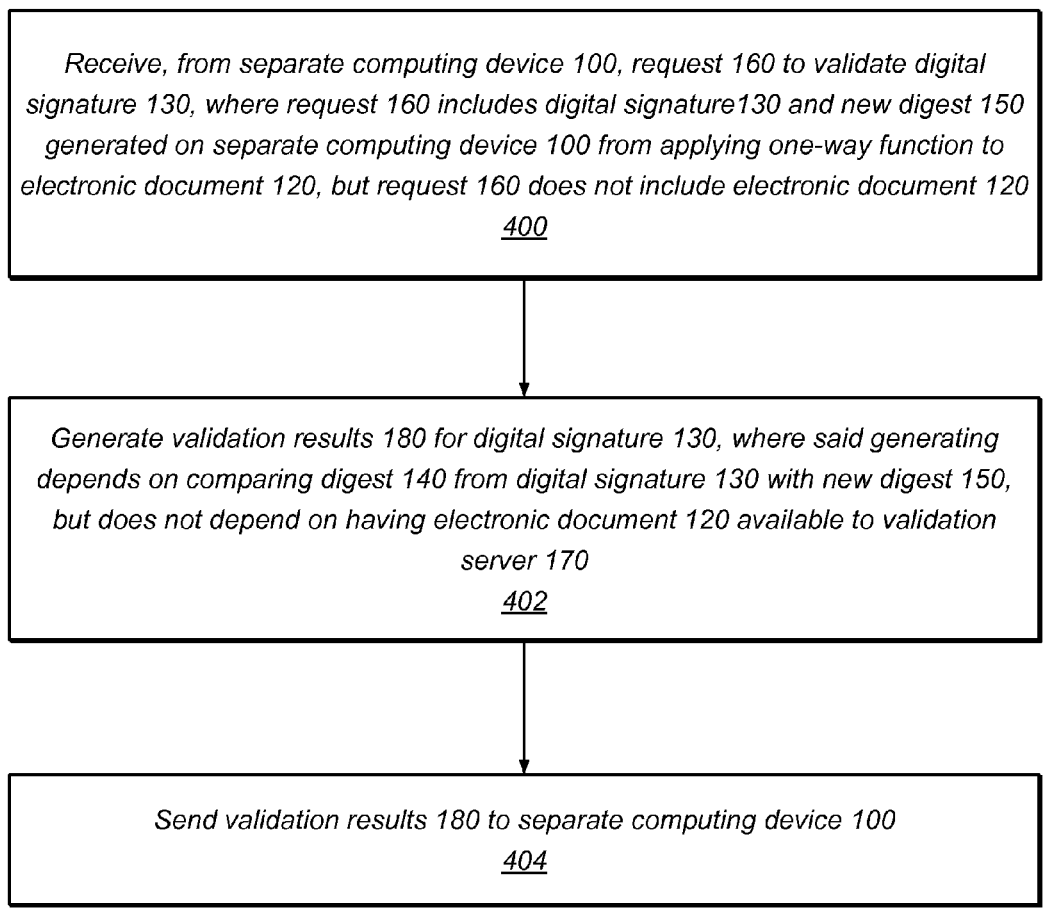
FIG. 4 is a flow diagram illustrating one embodiment of a method in which a validation server receives a request from a separate client computing device to validate a digitally signed electronic document being accessed by the separate client computing device.

FIGS. 1 and 2, and block 400 of FIG. 4, show validation server 170 receiving request 160 from separate computing device 100 to validate digital signature 130 for digitally signed electronic document 120, where digital signature 130 contains a message digest 140 of electronic document 120 generated from application of a one-way function to electronic document 120 by the signer of electronic document 120. Request 160 includes both digital signature 130 itself and a new message digest 150 of electronic document 120 generated by computing device 100 based on applying to a representation of electronic document 120 the same one-way function that the signer of electronic document 120 used to generate the signer's message digest 140 that is encrypted within digital signature 130. The request 160 received from computing device 100 explicitly excludes electronic document 120. As illustrated at block 402 of FIG. 4, validation server 170 generates validation results 180 for digital signature 130 based on comparing message digest 140 from digital signature 130 with new message digest 150, but without having electronic document 120 available for generating validation results 180.

For some other embodiments of signed electronic document 120, where signed electronic document 120 consists of data that includes a representation of electronic document 120 itself, along with digital signature 130, the representation of electronic document 120 accessed via computing device 100 may be an encryption of electronic document 120 into ciphertext that protects the confidentiality of electronic document 120. While this arrangement may add a layer of security, it also may require computing device 100, or some agent acting on behalf of computing device 100, to decrypt the ciphertext representation of electronic document 120 in order to recover a plaintext representation of electronic document 120 from which the new digest 150 can be generated.

The ciphertext representation of electronic document 120 transmitted from signed document source 200 to computing device 100 may have been generated by the creator of digital signature 130, or by an agent acting on behalf of the creator of digital signature 130, according to any of numerous techniques involving a public encryption key that corresponds to computing device 100, or that corresponds to a user of computing device 100. Although any of numerous symmetric and asymmetric methods may be applied in the encryption of electronic document 120 into ciphertext, and in the subsequent decryption of the ciphertext back into a plaintext representation of electronic document 120, it is useful to examine a particular common embodiment in which a ciphertext representation of electronic document 120 is generated via a symmetric-key algorithm that is substantially faster than many commonly used asymmetric-key algorithms. In one such shared secret symmetric-key embodiment, computing device 100 transmits a public encryption key corresponding to computing device 100, or corresponding to a user of computing device 100, to signed document source 200. Signed document source 200 generates a secret session key intended to be used jointly by computing device 100 and signed document source 200 for only a single transaction, and subsequently discarded. Signed document source 200 then generates a ciphertext representation of electronic document 120 by applying a symmetric-key algorithm to electronic document 120 using the generated secret session key. Signed document source 200 also encrypts the secret session key via a public-key encryption algorithm using the public encryption key obtained from computing device 100. Signed document source 200 transmits the ciphertext representation of electronic document 120, along with encrypted session key, to computing device 100.

Computing device 100 now has access to the ciphertext representation of electronic document 120 received from signed document source 200, from which computing device 100 can recover a plaintext representation of electronic document 120. Computing device 100 can then apply to the appropriate representation (decrypted or encrypted, depending on how the digest was calculated for the signature) of electronic document 120 the same one-way function that was previously applied by, or on behalf of, the signer of electronic document 120 to produce the message digest 140 that exists in encrypted form within digital signature 130. The application of the one-way function to the appropriate representation of electronic document 120 produces new message digest 150.

In embodiments where it is necessary to recover the plaintext representation of electronic document 120 from the ciphertext representation of electronic document 120, computing device 100 must first have access to the same secret session key used by signed document source 200 to generate the ciphertext representation of electronic document 120. To this end, computing device 100 decrypts the encrypted session key using the private decryption key that corresponds mathematically to the public encryption key, and that is in the possession of computing device 100, or of a user of computing device 100. Computing device 100 recovers the plaintext representation of electronic document 120 by applying the symmetric-key algorithm to the ciphertext representation of electronic document 120 using the shared secret session key.

Such a symmetric-key algorithm embodiment offers security in transmitting electronic document 120 between signed document source 200 and computing device 100. This may be especially useful when the communication channel between signed document source 200 and computing device 100 is weakly secured, or not secured at all. Recovery of the plaintext representation of electronic document 120 using such symmetric-key methods requires a relatively small expenditure of computing resources in comparison with the resources needed to perform encryption and decryption via asymmetric-key algorithms.

Computing device 100 needs to perform an asymmetric-key operation only to recover the secret session key encrypted with the public key provided to signed document source 200. The resources expended in recovering the secret session key are generally far smaller than would be spent in applying an asymmetric-key decryption algorithm to an asymmetric encryption of the entirety of electronic document 120. In general, applying the symmetric-key algorithm to the ciphertext using the shared secret session key is far less CPU-intensive than performing an asymmetric-key algorithm on ciphertext comprising an asymmetric encryption of electronic document 120. Once computing device 100 obtains the plaintext representation of electronic document 120, the distributed validation of digitally signed electronic document 120 may be accomplished precisely as described in the foregoing paragraphs.

Digital signatures 130 for electronic documents 120 permit authentication of signed electronic documents 120 using methods of public-key cryptography, that is, methods of public-key infrastructure (PKI). A signer of electronic document 120 may include the signer's public key, which corresponds mathematically to the signer's private key, in data transmitted from signed document source 200 to computing device 100.

In order to ensure that a signer of electronic document 120 is legitimately associated with the public key presented by the signer, a trusted certificate authority (CA) may issue a digital certificate that cryptographically binds the signing individual or entity to the signer's public key. The digital certificate may combine the signer's public key with identity information associated with the signer, and with other auxiliary data related to users or systems or processes.

Timestamps, from trusted time stamp authorities (TA), associated with signed electronic document 120 may be constructed as effective digital time signatures using methods similar to the ones employed in forming digital signature 130. For example, a signer of electronic document 120 may send a digest of contents of electronic document 120 to a timestamp server over a secure communications channel, and the timestamp server may sign the received digest with the timestamp server's private key and subsequently send the timestamp, comprising the signed digest and the public key corresponding to the timestamp server's private key, back to the signer. The timestamp received by the signer may be included in digital signature 130, or may accompany digital signature 130, in the data transmitted from signed document source 200 to computing device 100.

Thus, a timestamp or digital certificate may itself be signed using similar methods to those employed in signing electronic document 120. For some embodiments, one or more digital certificates and one or more timestamps may be embedded in digital signature 130, and digital signature 130 itself may be embedded in electronic document 120. In other instances digital signature 130 may not be embedded in electronic document 120, but rather be transmitted along with electronic document 120 in a data flow from signed document source 200 to computing device 100.

PKI (public-key interface) services may include any of various operations supported by certificate authorities and timestamp authorities, such as signing digital certificates, authenticating identities, checking certificate revocation data, securely time-stamping signature transactions, and verifying timestamp authenticity. In order to validate a digital signature 130, a validation mechanism or an entity such as validation server 170 may access separate, external PKI facilities, such as certificate authorities and timestamp servers, in order to verify authenticity of identities, certificates, and timestamps, perform certificate revocation checks, and fulfill any other necessary PKI requirements. These separate, external PKI facilities are illustrated in FIG. 2 as PKI entities 210. Validation server 170 thus may perform various public-key functions or operations in conjunction with separate, external PKI entities 210.

As described in the foregoing paragraphs, in the distributed validation of digitally signed electronic document 120, separate validation server 170 checks the integrity and authenticity of electronic document 120 by comparing the new message digest 150 of electronic document 120 with the signer's own message digest 140. The new message digest 150 was previously generated by computing device 100 based on applying to the representation of electronic document 120 available to computing device 100 the same one-way function that the signer of electronic document 120 applied to the signer's representation of electronic document 120 to generate the signer's own message digest 140 that is encrypted within digital signature 130. If new message digest 150 matches signer's message digest 140, then validation server 170 concludes that the signer's representation of electronic document 120 and the representation of electronic document 120 accessed by computing device 100 are the same.

As part of the distributed validation process for digitally signed electronic document 120, validation server 170 may check one or more digital certificates or timestamps that may be included in the request 160 received from computing device 100. Since some embodiments may embed into signed electronic document 120 elements such as digital signatures 130, digital certificates, timestamps, and other auxiliary information that is collateral to the core content of electronic document 120 itself, and since computing device 100 explicitly does not send electronic document 120 to validation server 170, it may be necessary for computing device 100 to extract such embedded digital signatures 130, digital certificates, timestamps, and other auxiliary information that is collateral to the core content of electronic document 120, and to include the extracted data in the request 160 that is transmitted to validation server 170. Even if such digital certificate and timestamp and other collateral data is not embedded in electronic document 120, but only accompanies computing device 100's copy of electronic document 120 as an attachment, or as some other data structure, computing device 100 may still include the digital certificate and timestamp and other collateral data in the request 160 that is transmitted to validation server 170. Since validation server 170 manages most of the PKI functions required to complete the validation process for digitally signed electronic document 120, it may need access to the digital certificate, timestamp, and other collateral data.

Validation server 170 may check one or more digital certificates associated with signed electronic document 120, such as the signer's digital certificate, to establish a link between the one or more certificates and a trust anchor. Validation server 170 may build a chain whose links form a sequence of digital certificates, each certifying its predecessor, that starts, for example, with the signer's digital certificate, and forms one or more paths passing through intermediate certificate authorities, and terminating in a trust anchor. In order for validation server 170 to establish such chains to trust anchors, and in order to perform other validation functions, validation server 170 may transmit digital certificates, timestamps, and other collateral data to separate PKI entities 210 shown in FIG. 2. PKI entities 210 may include one or more certificate authorities (CAs), one or more timestamp authorities (TAs), one or more registration authorities (RAs), and any other agency or agencies required to complete the validation of digitally signed electronic document 120.

Digitally signed electronic document 120 may include timestamps indicating various times, such as the time of creation of digital signature 130, or a time before or after the creation of digital signature 130, and the validation process may include verifying any such timestamps through a trusted timestamp authority and performing other checks relative to the times given in the timestamps. Validation of digital signature 130 or of digitally signed electronic document 120 may be performed relative to a particular timestamp. Verification of timestamps may require validation server 170 to construct chains that reach a trusted timestamp authority. If a timestamp for digital signature 130 cannot be verified, validation server 170 may perform the validation relative to some other time or timestamp.

Collateral data transmitted from computing device 100 to validation server 170 may include certificate revocation information usable by validation server 170, in conjunction with PKI entities 210, to determine if and when one or more digital certificates associated with signed electronic document 120 may have been revoked prior to the initiation of the distributed validation procedures on validation server 170, and to determine if and when digital certificates associated with signed electronic document 120 may be scheduled for future revocation. Collateral revocation information may be stored in electronic document 120, or it may be kept elsewhere. Depending upon the embodiments, collateral revocation information may be accessible to validation server 170 by virtue of being embedded in digital signature 130, embedded in signed electronic document 120, stored on signed document source 200 or on computing device 100, or otherwise available via online access. If the collateral revocation information is embedded in signed electronic document 120, computing device 100 may extract it and include it in request 160. Similarly, computing device 100 may access the revocation information embodied in some other form in data received from signed document 200, and include the revocation information in request 160.

Validation server 170 may thus obtain, from request 160, various collateral data, including revocation information, that may be used in validating signed electronic document 120. Alternatively, in some instances, validation server 170 may directly access revocation information already stored on validation server 170 itself, or may directly access revocation information maintained separately from validation server 170 and from computing device 100. For example, revocation data may be maintained on PKI entities 210.

Validation server 170 may check the revocation status of some or all of the digital certificates in a digital certificate chain constructed by validation server 170. Different methods may be used to check the revocation status of digital certificates. For example, validation server 170 may consult a certificate revocation list (CRL) that is stored on validation server 170 itself or that is accessible via a CRL server. Alternatively, validation server 170 may obtain revocation status for digital certificates through the Internet via Online Certificate Status Protocol (OCSP), which permits checking the status of digital certificates in real time by communicating with external PKI entities 210. PKI entities 210 may include OCSP servers providing status information, such as revocation status, for digital certificates.

Collateral information, such as digital certificates, timestamps, and certificate revocation data, may be saved on validation server 170 for future validation transactions. For an electronic document 120 kept on several different computing devices 100, validation server 170 may increase operational efficiency by saving collateral information used to validate signed electronic document 120 for one of the several different computing devices 100, and subsequently reusing the saved collateral information to validate signed electronic document 120 for another of the several different computing devices 100. Such caching of credentials on validation server 170 may permit future validations to be performed by validation server 170 without consulting external PKI entities 210, or may decrease the number of validation operations that require communication with external PKI entities 210. Moreover, pooling collateral information such as digital certificates, timestamps, and revocation data on validation server 170 further enhances the speed and efficiency already gained in shifting processes for validating signed electronic document 120 away from computing device 100 and onto validation server 170.

Various components of the collateral information, such as timestamps and revocation information may also be digitally signed. Their digital signatures may be validated in the same manner as described above for the main digital signature for the document. In some embodiments, the validation of a collateral data component's digital signature may be performed completely on the server. For example, the signed content of each of the collateral data components may be the component itself, in which case the signature would be validated entirely on the server since the full collateral component is sent to the server.

Validation of digital signatures 130 of electronic document 120 may involve making calculations based on external parameters specified for signed electronic document 120. For instance, external time parameters may specify a particular time with respect to which the validation is to be performed. A parameter may set a time with respect to which a validation is to be performed as the time of creation of digital signature 130, or as the current time, or any other time, depending upon the circumstances. Such external parameters may be passed in request 160, and may also be configured on validation server 170 for a particular account or for a particular electronic document 120 or for a collection of several computing devices 100. By configuring such parameters on validation server 170, the same validation environment may be preserved for a particular account, for a particular electronic document 120, for a particular computing device 100, or for a particular group of computing devices 100.

Communication among signed document source 200, computing device 100, validation server 170, and PKI entities 210 may be carried over the Internet or other network channels secured by any of numerous well-known standard security protocols such as Transport Layer Security (TLS), Secure Sockets Layer (SSL), and Hypertext Transfer Protocol Secure (HTTPS), or secured by a non-standard ad hoc security protocol.

As described in the foregoing paragraphs, the distributed validation of digitally signed electronic documents described herein both protects the confidentiality of the contents of electronic document 120 and limits the bandwidth burden placed on computing device 100 in validating digitally signed electronic document 120. These distributed validation mechanisms also make it feasible to validate digitally signed electronic documents 120 from a lightweight or portable or mobile computing device 100, such as a mobile phone or a tablet computer which, whose processing power, storage capacity, software potential, or transmission bandwidth may make it infeasible to install adequate PKI support on computing device 100, and may also make infeasible the transfer of large amounts of data, such as electronic document 120 itself, to a receiving entity. For some embodiments, computing device 100 may initiate distributed validation of a digitally signed electronic document 120, and subsequently receive validation results 180 from validation server 170, without ever performing any public-key infrastructure operation on computing device 100 itself. For some such embodiments, distributed validation of a digitally signed electronic document 120 may proceed without having any public-key infrastructure utilities installed on computing device 100 itself.

Exemplary Computer System

It is contemplated that in some embodiments, any of the methods, techniques or components described above may be implemented as instructions and data capable of being stored or conveyed via a non-transitory computer-accessible medium. Such methods or techniques may include, for example and without limitation, the various methods for distributed validation of digitally signed electronic documents, as described in the foregoing paragraphs. Any partition of the components illustrated in FIGS. 1 and 2, or any other such array of components as may be implemented in various embodiments to perform the methods and techniques described above, may be implemented as such instructions. Such instructions may be executed to perform a particular computational function, such as generating, sending, or receiving a message, to implement mathematical functions such as integration, differentiation, convolution, etc., as well as to implement higher-order functions such as operating system functioning, network communications functioning, application functioning, and/or any other suitable functions.

Figure 5:
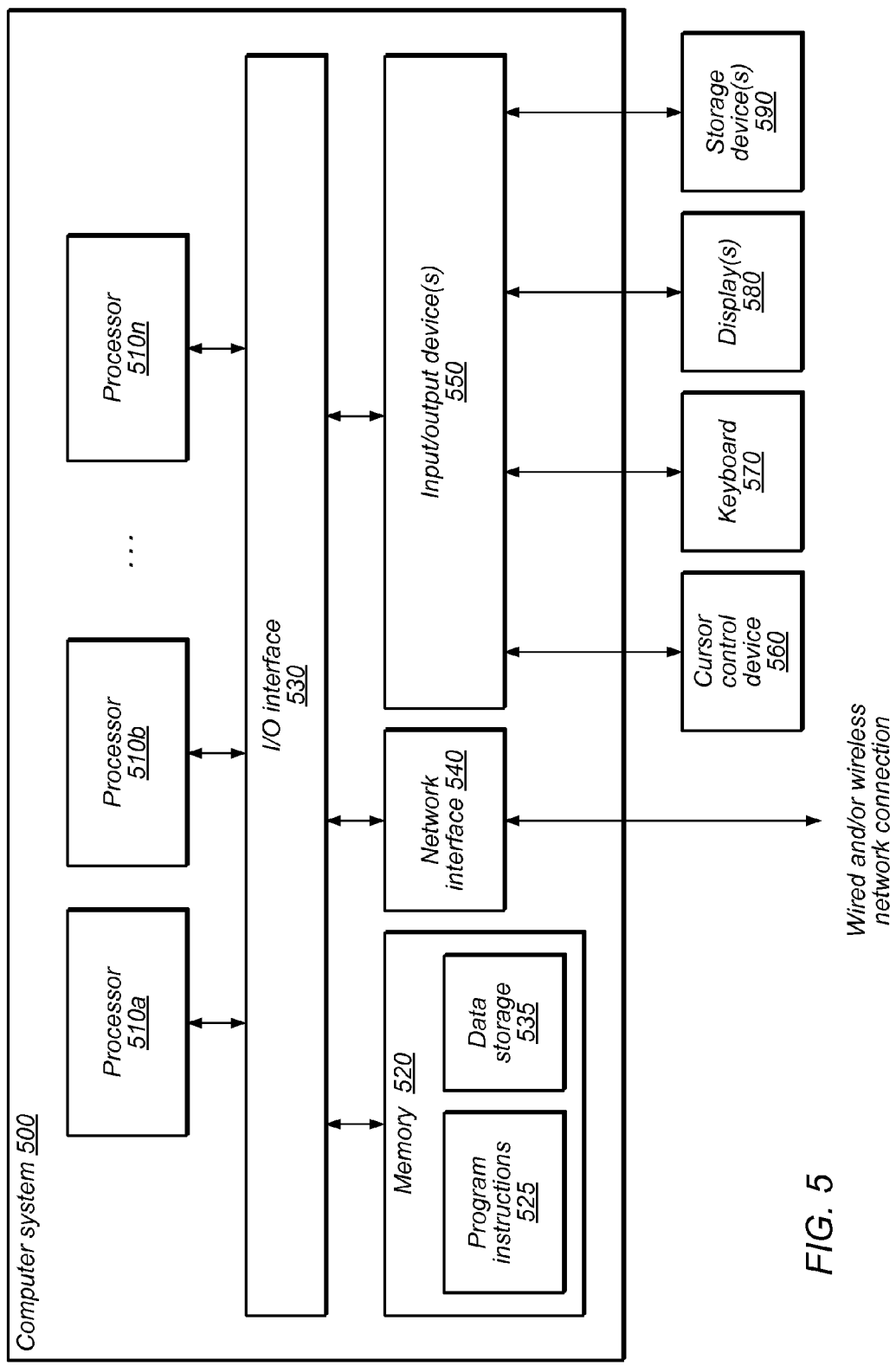
FIG. 5 is a block diagram illustrating an embodiment of a computer system implementing one or more components of an environment for distributed validation of digitally signed electronic documents.

One exemplary embodiment of a computer system including tangible, computer-accessible storage media is illustrated in FIG. 5. In the illustrated embodiment, computer system 500 includes one or more processors 510 coupled to a system memory 520 via an input/output (I/O) interface 530. Computer system 500 further includes a network interface 540 coupled to I/O interface 530. In different embodiments, system 500 may be variously configured as a desktop computer system, a laptop or notebook or netbook computer, a tablet computer, a mainframe computer system, a workstation, a network computer, a handheld computing device such as a handheld transceiver, personal digital assistant, cellular phone, media player, or combination device, a camera, a set top box, a mobile device, a consumer device, a game console, a handheld game device, an application server, a storage device, a peripheral device such as a printer, copy machine, switch, modem, or router, or another type of computing or electronic device.

In various embodiments, computer system 500 may be a uniprocessor system including one processor 510, or a multiprocessor system including several processors 510 (e.g., two, four, eight, or another suitable number). Processors 510 may be any suitable processor capable of executing instructions. For example, in various embodiments processors 510 may be a general-purpose or embedded processor implementing any of a variety of instruction set architectures (ISAs), such as the x86, PowerPC™, SPARC™, or MIPS™ ISAs, or any other suitable ISA. In multiprocessor systems, each of processors 510 may commonly, but not necessarily, implement the same ISA.

System memory 520 may be configured to store instructions and data accessible by processor 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, instructions and data implementing desired functions, methods or techniques, such as those described above, are shown stored within system memory 520 as program instructions 525 and data storage 535. It is noted that in some embodiments, program instructions 525 and data storage 535 may include instructions and data implementing desired functions that are not directly executable by processor 510 but are represented or encoded in an abstract form that is translatable to instructions that are directly executable by processor 510. For example, program instructions 525 may include instructions specified in an ISA that may be emulated by processor 510, or by other code executable on processor 510. Alternatively, program instructions 525 may include instructions, procedures or statements implemented in an abstract programming language that may be compiled or interpreted in the course of execution. As non-limiting examples, program instructions 525 may include code specified in a procedural or object-oriented programming language such as C or C++, a scripting language such as Perl or Ruby or Python, a markup language such as HTML or XML, or any other suitable language.

In one embodiment, I/O interface 530 may be configured to coordinate I/O traffic between processor 510, system memory 520, and any peripheral devices in the device, including network interface 540 or other peripheral interfaces. In some embodiments, I/O interface 530 may perform any necessary protocol, timing or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functioning of I/O interface 530, such as an interface to system memory 520, may be incorporated directly into processor 510.

Network interface 540 may be configured to allow data to be exchanged between computer system 500 and other devices attached to a network 550, such as other computer systems or communications devices, for example. In particular, network interface 540 may be configured to allow communication between computer system 500 and various external devices. These external devices may include various computing and communications devices, which may include elements similar to those of computer system 500. In particular, the external devices may include personal computers, telephony devices or network-attached computing devices that users may employ to access network services. Network interface 540 may commonly support one or more wireless networking protocols (e.g., Wi-Fi/IEEE 802.11, or another wireless networking standard). However, in various embodiments, network interface 540 may support communication via any suitable wired or wireless general data networks, such as other types of Ethernet network, for example. Additionally, network interface 540 may support communication via telecommunications/telephony networks such as analog voice networks or digital fiber communications networks, via storage area networks such as Fibre Channel SANs, or via any other suitable type of network and/or protocol.

In some embodiments, system memory 520 may be one embodiment of a tangible, non-transitory computer-accessible storage medium configured to store instructions and data as described above. However, in other embodiments, instructions and/or data may be stored upon and retrieved from different types of computer-accessible storage media. Generally speaking, a non-transitory computer-accessible medium may include storage media or memory media such as magnetic or optical media, e.g., disk or CD/DVD-ROM coupled to computer system 500 via I/O interface 530. A non-transitory computer-accessible medium may also include any volatile or non-volatile media such as RAM (e.g. SDRAM, DDR SDRAM, RDRAM, SRAM, etc.), ROM, etc., that may be included in some embodiments of computer system 500 as system memory 520 or another type of memory. A non-transitory computer-accessible medium may generally be accessible via transmission media or signals such as electrical, electromagnetic, or digital signals, which may be conveyed via a communication medium such as a network and/or a wireless link, such as may be accessed via network interface 540.

It is noted that the various methods illustrated in the figures and described above represent exemplary embodiments of methods. These methods may be implemented in software, hardware or any suitable combination thereof. Where suitable, the order of operation of method elements is not restricted to the order described or shown, and in other embodiments various method elements may be performed in a different order. It is also contemplated that in various embodiments, not all method elements need be performed, and existing method elements may be modified or additional elements added.

Although the embodiments above have been described in considerable detail, numerous variations and modifications will become apparent to those skilled in the art once the above disclosure is fully appreciated. It is intended that the following claims be interpreted to embrace all such variations and modifications. Accordingly, the above description is to be regarded in an illustrative rather than a restrictive sense.

What is claimed is:

1. A method, comprising:
performing, by a computing device:
accessing an electronic document and a digital signature for the electronic document, the digital signature comprising a digest of the electronic document generated from applying a one-way function to the electronic document;
generating a new digest of the electronic document, said generating the new digest comprises applying the one-way function to the accessed electronic document;
sending, for receipt by a separate validation server, a request to validate the digital signature, the request comprising the digital signature and the new digest, and does not include the electronic document; and
receiving, from the separate validation server, validation results for the digital signature, the validation results depending from a comparison of the digest from the digital signature with the new digest on the separate validation server, the comparison being:
based on a comparison of the digital signature sent by the computing device with the new digest sent by the computing device; and
independent of having the electronic document available to the validation server.

2. The method of claim 1, wherein the one-way function is a cryptographic hash function.

3. The method of claim 1, wherein the computing device is a mobile phone device or a tablet computer.

4. The method of claim 1, wherein the request further comprises data collateral to core content of the electronic document, the data collateral to core content of the electronic document including one or more of: a digital certificate that cryptographically binds a signer of the electronic document to the signer's public key, a timestamp associated with the electronic document, or auxiliary document information.

5. The method of claim 1, wherein applying the one-way function to the electronic document yields a message digest which is smaller than the electronic document.

6. The method of claim 1, wherein the validation results indicate whether a representation of the electronic document from which the digest is generated, and a representation of the electronic document from which the new digest is generated, are equivalent representations of the electronic document.

7. The method of claim 1, wherein the validation results indicate whether the digital signature for the electronic document is authentic.

8. The method of claim 1, wherein said accessing a representation of the electronic document and said generating a new digest of the electronic document are performed without performing a decryption of the electronic document.

9. The method of claim 1, further comprising decrypting the electronic document prior to said generating a new digest of the electronic document.

10. The method of claim 1, wherein the digital signature is validated without executing the public-key encryption algorithms or public-key decryption algorithms on the computing device to obtain the digest from the digital signature.

11. The method of claim 1, wherein the request comprises certificate revocation information transmitted to the separate validation server for use in determining revocation status for one or more digital certificates associated with the signed electronic document.

12. A system, comprising:
a processor; and
a memory coupled to the processor, wherein the memory stores program instructions executable by the processor to perform:
accessing, by a computing device, an electronic document and a digital signature for the electronic document, the digital signature comprises a digest of the electronic document generated from applying a one-way function to the electronic document;
generating, by the computing device, a new digest of the electronic document, said generating the new digest comprises applying the one-way function to the accessed electronic document;
sending, by the computing device to a separate validation server, a request to validate the digital signature, the request comprises the digital signature and the new digest, but does not include the electronic document; and
receiving, at the computing device from the separate validation server, validation results for the digital signature, the validation results depending from a comparison of the digest from the digital signature with the new digest on the separate validation server, the comparison being:
based on a comparison of the digital signature sent by the computing device with the new digest sent by the computing device; and
independent of having the electronic document available to the validation server.

13. A non-transitory computer-readable storage medium storing instructions that when executed by a computing device perform:
accessing an electronic document and a digital signature for the electronic document, the digital signature comprises a digest of the electronic document generated from applying a one-way function to the electronic document;
generating a new digest of the electronic document, said generating the new digest comprises applying the one-way function to the accessed electronic document;
sending, to a separate validation server, a request to validate the digital signature, the request comprises the digital signature and the new digest, but does not include the electronic document; and
receiving, from the separate validation server, validation results for the digital signature, the validation results depending from a comparison of the digest from the digital signature with the new digest on the separate validation server, the comparison being:
based on a comparison of the digital signature sent by the computing device with the new digest sent by the computing device; and
independent of having the electronic document available to the validation server.

14. A system, comprising:
a processor; and
a memory coupled to the processor, wherein the memory stores program instructions for a validation server executable by the processor to perform:

receiving, from a separate computing device, a request to validate a digital signature for an electronic document, such that:
  the digital signature comprises a digest of the electronic document generated from applying a one-way function to the electronic document; and
  the request comprises the digital signature and a new digest of the electronic document generated on the separate computing device from applying the one-way function to the electronic document, but the request does not include the electronic document;
generating validation results for the digital signature, the generating validation results depending from a comparison of the digest from the digital signature with the new digest, the comparison being:
  based on a comparison of the digital signature received from the separate computing device and the new digest received from the separate computing device; and
  independent of having the electronic document available to the validation server.

15. The system of claim 14, wherein the request further includes data collateral to core content of the electronic document, the data collateral to core content of the electronic document including one or more of: a digital certificate that cryptographically binds a signer of the electronic document to the signer's public key, a timestamp associated with the electronic document, or auxiliary document information.

16. The system of claim 14, wherein:
  the request further includes certificate revocation information; and
  the program instructions for performing said generating the validation results cause the validation server to determine revocation status for one or more digital certificates associated with the signed electronic document.

17. The system of claim 14, wherein the program instructions for performing said generating the validation results cause the validation server to check one or more digital certificates associated with the electronic document to establish a link between the one or more certificates and a trust anchor, wherein said checking comprises extracting the one or more digital certificates from the digital signature and building a chain from the one or more digital certificates.

18. The system of claim 14, wherein the program instructions for performing said generating the validation results cause the validation server to generate the validation results with respect to a particular time specified by a time parameter for the electronic document.

19. The system of claim 14, wherein the program instructions for the validation server cause the validation server to perform one or more public-key interface functions in conjunction with one or more separate, external public-key interface entities.

20. The system of claim 14, wherein said receiving and said sending are performed over a channel that connects the validation server and the separate computing device that is secured by a security protocol.

* * * * *